Feb. 14, 1956     H. J. HORN     2,734,779
VEHICLE WHEEL
Filed Sept. 4, 1951

INVENTOR.
HARRY J. HORN
BY Barnes, Kisselle, Laughlin & Raisch
ATTORNEYS

United States Patent Office 2,734,779
Patented Feb. 14, 1956

2,734,779

VEHICLE WHEEL

Harry J. Horn, Lansing, Mich., assignor to Motor Wheel Corporation, Lansing, Mich., a corporation of Michigan Application September 4, 1951, Serial No. 244,917

6 Claims. (Cl. 301—37)

This invention relates to vehicle wheels and more particularly to the means for detachably connecting ornamental covers thereto.

The principal object of the present invention is to provide a simple and effective attaching device integral with the wheel which is particularly effective in attaching a wheel cover to the wheel.

Another object is to provide such an attaching means which is especially economical to manufacture.

Figure 1:
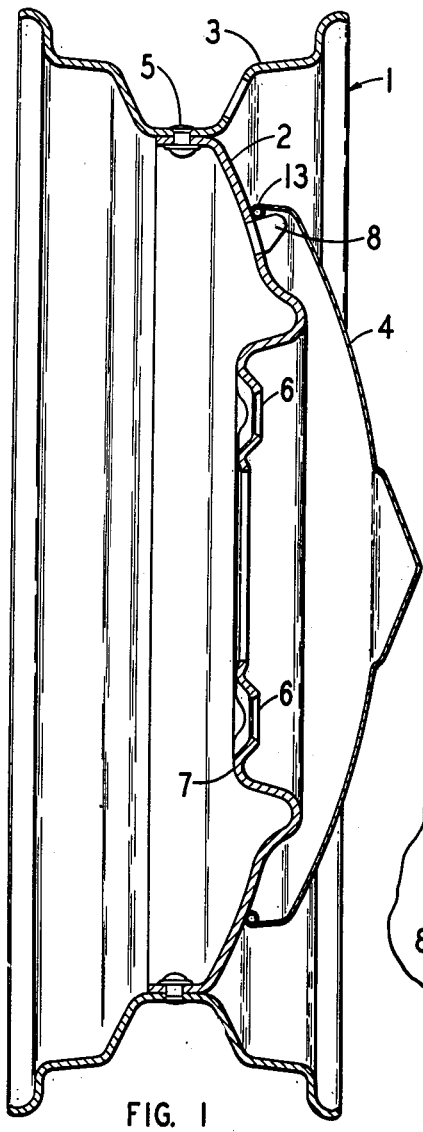
Fig. 1 is a cross-sectional view on an enlarged scale taken along the line 1—1 of Fig. 2.
Figure 2:
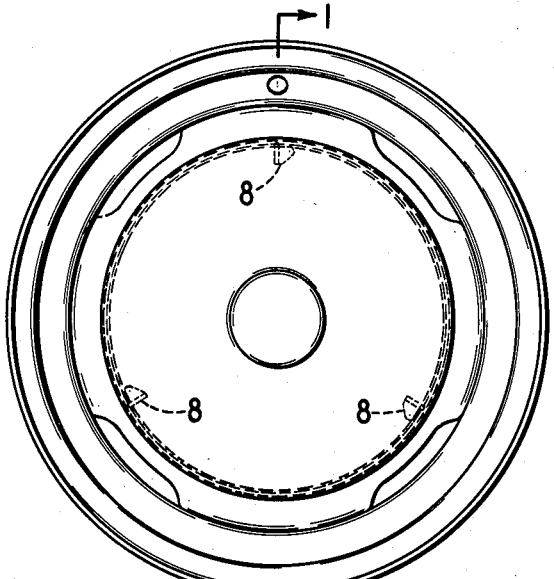
Fig. 2 is a front elevational view of a wheel embodying the instant invention.
Figure 3:
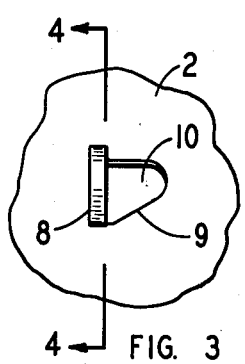
Fig. 3 is a fragmentary front elevation of the wheel body with the cover plate removed showing the cover plate attachment.
Figure 4:
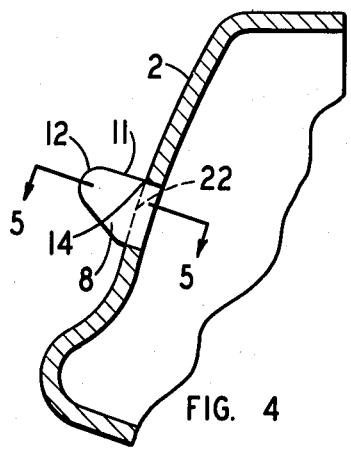
Fig. 4 is a section along the line 4—4 of Fig. 3.

Figs. 1 through 5 illustrate one form of the invention. The invention is shown as applied to a wheel 1 having a wheel body 2, a rim 3 and a cover 4. The wheel body 2 and rim 3 are connected together by any suitable means, such as rivets 5. The wheel body is provided with a central dished portion 7 having openings 6 therein for the reception of bolts or cap screws for demountably attaching the wheel to a hub.

Radially outwardly of the central dished portion 7 the wheel body is provided with a plurality, preferably three or more, sheared out fingers 8. Three fingers 8 equispaced both radially and circumferentially of the wheel body have proved satisfactory. The shape of the attaching portion or finger 8 is determined by the contour of the shearing punch. Fingers 8 are identical so a description of one finger 8 will suffice for all.

Each finger 8 is formed by shearing the wheel body 2 along a generally U-shaped shear line 9 which form the periphery of opening 10, and then bending the shearing portion outwardly at right angles to the wheel body to form finger 8. The upper edge 11 of each finger 8 is inclined downwardly from the outer end 12 of the finger toward the wheel body 2. The radial outward edge 11 of each finger 8 is preferably a substantially straight edge and is inclined at an angle of less than 90° with the vertical plane of the wheel, that is, a plane extending perpendicular to the axis of rotation of the wheel.

The cover 4 is preferably provided with a beaded edge 13. The inner circumference or diameter of bead 13 will be slightly less than the circumference of a circle passing through the junction points of the wheel body 2 and face 11 which is indicated at 14. The outer corner 12 of each finger will be in the form of a curve or arc or inclined surface so that the upper portion of edge 11 acts as a ramp or cam to aid in mounting the cover over the fingers. Since fingers 8 are positioned edgewise radially of the wheel, they will be stiff so as to withstand the radially directed compressive forces exerted against them by the cover 4.

In assembling the cover 4 on to the wheel, assuming that three attaching fingers 8 are used, the beaded edge 13 of the cover will be positioned over two of the fingers 8 and the bead 13 will contact the arcuate edge 12 of the third finger 8. By pressing the cover 4 toward the wheel body 2, the bead will climb up arcuate edge 12 thus distorting the bead 13 out of round until the bead reaches outer edge 11 of the finger 8 whereupon bead 13, which will be in tension, will tend to contract and resume its circular form and thus cause the bead to ride down the edge 11 until it comes into substantially complete circumferential contact with the outer face of body 2. The bead 13 will still be under a desired amount of tension when it bears against the outer face of wheel body 2 at each of the three fingers 8 and thus hold the cover 4 yieldably but tightly upon the wheel body.

Figure 6:
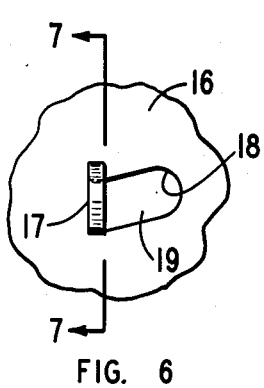
Fig. 6 is a view similar to Fig. 3 showing a modified form of the attachment.
Figure 7:
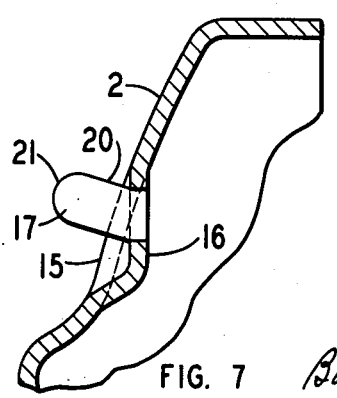
Fig. 7 is a section along the line 7—7 of Fig. 6.
Figure 5:
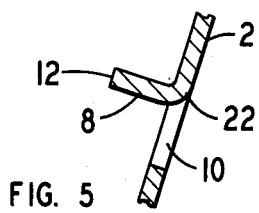
Fig. 5 is a section along the line 5—5 of Fig. 4.

In the form shown in Figs. 6 and 7, a plurality of pockets 15, preferably three, are first pressed into the wheel body 2 so as to provide each pocket 15 with a face 16 which lies substantially in a plane vertical to the axis of the wheel. Out of each radial flat face 16 is sheared a finger 17 having a contour identical with the periphery 18 of hole 19 resulting from shearing the finger 17 out of wall 16 and bending it axially outwardly to a position at right angles to the wall 16. Thus, fingers 17, like fingers 8, all lie in planes extending radially of the wheel axis. Finger 17 is provided with a straight edge 20 corresponding to edge 11 and an arcuate outer end 21 corresponding to end 12. Fingers 17 function and cooperate in retaining cover 4 on the wheel body 2 in the same manner as fingers 8. It will be noted that the junction or line of bending 22 of both fingers 8 and 17 extends radially of the wheel body.

I claim:

1. In a wheel having a sheet metal wheel body, means on said wheel body for attaching a cover thereto comprising a plurality of fingers sheared out of said wheel body and bent at substantially right angles thereto, each of said fingers being free of one end and being connected with said wheel body along a generally radial line at its other end, said fingers being spaced circumferentially about the axis of said wheel body, the upper edge of each said finger being inclined axially and radially inwardly of said wheel body whereby the outer end of the upper edge of said finger is positioned radially a greater distance from the axis of the wheel body than the junction of said upper edge with the outer face of the wheel body, said free outer end of each finger being inclined with respect to said upper edge to serve as a ramp over which the outer edge of the cover is adapted to be pressed in assembling the cover on the wheel.

2. The combination claimed in claim 1 wherein the wheel body adjacent each finger is provided with an opening resulting from the finger which has been sheared out of the wheel body, the periphery of said opening having the same contour as the outer edge of said finger.

3. The combination defined in claim 2 wherein each finger is planar in a radial plane parallel to, and passing through, the wheel axis and has its greatest dimension in this plane.

4. The combination comprising a sheet metal wheel body, a cover therefor, said cover comprising a dished member having a relatively flexible bead along its circumference, and means for detachably connecting said cover to said wheel comprising a plurality of fingers sheared out of said wheel body and bent at substantially right angles thereto along a bend line extending substantially radially of said wheel body, said fingers having a free outer end and being spaced circumferentially about the axis of said wheel body, the radially outer edge of each said finger being inclined axially and radially inwardly of said wheel body whereby the outer end of the upper edge of said finger is positioned radially a greater distance from the axis of the wheel body than the junction of said upper edge with the outer face of the wheel body, said free outer end of each finger being shaped to serve as a ramp over which the outer edge of the cover is adapted to be pressed in assembling the cover on the wheel, the radially outer edge of said fingers being arranged on a circle of greater circumference than the inner circumference of the cover bead whereby the rim of the cover is distorted when forced over said fingers to thereby yieldably retain the cover on said fingers.

5. A vehicle wheel having a sheet metal body, said body having a plurality of substantially flat circumferentially spaced areas each spaced equidistant from the axis of the wheel, said flat areas all lying in a plane substantially perpendicular to the axis of the wheel, a plurality of fingers sheared one out of each of said flat areas and bent at substantially right angles thereto at one end along a bend line extending substantially radially of said wheel body, said fingers having a free outer end, the upper edge of each finger being inclined axially and radially inwardly of said wheel body whereby the free outer end of the upper edge of said finger is positioned radially a greater distance from the axis of the wheel body than the junction of said upper edge with the outer face of the wheel body, said outer end of each finger being inclined with respect to said upper edge to serve as a ramp over which the outer edge of the cover is adapted to be pressed in assembling the cover on the wheel.

6. In a wheel having a sheet metal wheel body, means on said wheel body for attaching a cover thereto comprising a plurality of fingers spaced circumferentially about the axis of said wheel body, each said finger being sheared out of said wheel body and bent at substantially right angles thereto along a bend line extending substantially radially of said wheel body, each said finger being connected to the wheel body along said bend line and having a free outer end, each said finger being planar in a radial plane parallel to and passing through the axis of the wheel, the radial extent of each said finger being several times greater than the thickness thereof, whereby each said finger is sufficiently stiff to withstand the radially compressive forces exerted against said finger by the cover, the upper edge of each said finger being substantially straight and extending axially and radially outwardly toward the outer end of the finger whereby the outer end of the upper edge of said finger is positioned radially a greater distance from the axis of the wheel body than the junction of said upper edge with the outer face of the wheel body, each said finger having its free outer end curved to serve as a ramp over which the outer edge of the cover is adapted to be pressed in assembling the cover on the wheel.

References Cited in the file of this patent

UNITED STATES PATENTS

| | | |
|---|---|---|
| 1,861,226 | O'Connor | May 31, 1932 |
| 2,020,885 | Gatta | Nov. 12, 1935 |
| 2,470,559 | Horn | May 17, 1949 |
| 2,546,508 | Horn | Mar. 27, 1951 |